(12) United States Patent
Luo et al.

(10) Patent No.: US 10,219,053 B2
(45) Date of Patent: Feb. 26, 2019

(54) FIBER-TO-COAX CONVERSION UNIT AND METHOD OF USING SAME

(71) Applicant: Viavi Solutions, Inc., San Jose, CA (US)

(72) Inventors: Alex Luo, Sunnyvale, CA (US); Terry W. Bush, Greenwood, IN (US)

(73) Assignee: Viavi Solutions, Inc., San Jose, CA (US)

( * ) Notice: Subject to any disclaimer, the term of this patent is extended or adjusted under 35 U.S.C. 154(b) by 0 days.

(21) Appl. No.: 15/472,853

(22) Filed: Mar. 29, 2017

(65) Prior Publication Data

US 2017/0289656 A1    Oct. 5, 2017

Related U.S. Application Data

(60) Provisional application No. 62/338,288, filed on May 18, 2016, provisional application No. 62/314,483, filed on Mar. 29, 2016.

(51) Int. Cl.

| H04B 10/40 | (2013.01) |
| H04B 10/50 | (2013.01) |
| H04B 10/60 | (2013.01) |
| H04Q 11/00 | (2006.01) |
| H04B 10/2575 | (2013.01) |
| H04B 10/2587 | (2013.01) |

(52) U.S. Cl.
CPC ... H04Q 11/0067 (2013.01); H04B 10/25751 (2013.01); H04Q 11/0071 (2013.01); H04B 10/2575 (2013.01); H04B 10/2587 (2013.01); H04B 10/40 (2013.01); H04B 10/50 (2013.01); H04B 10/60 (2013.01)

(58) Field of Classification Search
None
See application file for complete search history.

(56) References Cited

U.S. PATENT DOCUMENTS

| 8,027,473 B2 * | 9/2011 | Stiscia | H04L 63/0428 370/397 |
| 2005/0265386 A1 * | 12/2005 | Smith | H04J 14/0226 370/466 |
| 2011/0069956 A1 * | 3/2011 | Biegert | H04B 10/66 398/58 |

* cited by examiner

*Primary Examiner* — Darren E Wolf
(74) *Attorney, Agent, or Firm* — Barnes & Thornburg LLP (57) ABSTRACT

A fiber-to-coax optical network unit for converting one or more Gigabit or Ethernet Passive Optical Network (GPON or EPON) fibers to one or more coaxial cable lines to connect a subscriber's premises to a Community Access Television (CATV) system.

13 Claims, 9 Drawing Sheets

FIBER-TO-COAX CONVERSION UNIT AND METHOD OF USING SAME

This application claims priority under 35 U.S.C. § 119 to U.S. patent application Ser. No. 62/314,483, which was filed Mar. 29, 2016, and U.S. patent application Ser. No. 62/338, 288, which was filed on May 18, 2016. The entireties of those applications are expressly incorporated herein by reference.

TECHNICAL FIELD

The present disclosure relates generally to fiber and coax cable technologies for transmitting and receiving Internet Protocol (IP) content and, more specifically, to devices for transmitting and receiving digital content to a subscriber's premises.

BACKGROUND

In hybrid fiber coax (hereinafter sometimes HFC) and radio frequency (RF) over glass (hereinafter sometimes RFOG) and passive optical network (hereinafter sometimes PON) CATV (hereinafter sometimes cable) plant designs, there is a forward path (from the cable company's transmission point to the subscriber's premises) and a return path (from the subscriber's premises back to the cable company's receiving point). The goals of all of these technologies are to provide a communication infrastructure for video, audio, and data. With the advent of the Internet Protocols (hereinafter sometimes called IP), it is the ultimate goal for cable companies to move to an IP-based communication network with fiber leading the way on maximum data capacity. The leading technologies are PON-based systems. Either GPON (Gigabit Passive Optical Network) and EPON (Ethernet Passive Optical Network) along with their 10 Gigabit newer specifications (10G PON/10G EPON).

Because it is extremely capital cost and labor expensive to replace all of the coaxial cable in the world with fiber, cable companies have been moving in stages. The first stage (S1) was moving from all coax to an HFC network where the fiber reached part way out into the system; usually the node. The second stage (S2) is to reach fiber out to the pedestal or aerial mounted TAP which typically feeds 4 or 8 homes. The last and most expensive stage (S3) would be to take fiber all the way to the home. New subdivision developments today start with this final stage (S3) of fiber directly to the home.

With each step taken by the cable companies, the speed and quality of the network improves because fiber is inherently lower in noise content and a more efficient medium of transferring information. It should be noted that after each step is taken, a time period usually exists for the cable companies to recoup their investment. This disclosure focuses on extending the useful life of stage S2.

In some Stage S2 systems, fiber reaches the pedestal or aerial Tap and allows the cable company to use RFOG to get data from the Tap into the customers home. RFOG still requires DOCSIS standards for data transport.

Due to the increasing demand of higher Internet speed to support digitized video, voice, and data applications, legacy HFC networks face the challenge of catching the competition from regular Fiber-To-The-Home (FTTH) and Wireless (4G, 5G LTE) service providers to serve every subscriber to reach at least 1 Gbps downlink speed without upgrading the existing equipment to support the latest but more expensive DOCSIS standard.

SUMMARY

According to one aspect, an apparatus comprising a housing and an optical network unit and an adaptor positioned in the housing. The optical network unit is configured to convert a fiber optical signal into a second signal type, and the adaptor is configured to convert the second signal type into an RF signal. The adaptor includes a port configured to receive a coaxial cable connector.

In some embodiments, the optical network unit may include a plurality of optical network units operable to utilize at least one of GPON, EPON, 10G-PON, and 10G-EPON. In some embodiments, the adaptor may include a plurality of adaptors.

In some embodiments, the apparatus further may comprise a switch configured to selectively connect each adaptor to the optical network unit.

In some embodiments, the apparatus may further comprise a splitter positioned in the housing and connected to the optical network unit. The splitter may be configured to convert a single fiber optical signal into multiple fiber optical signals. The optical network unit may be operable to convert each of the multiple optical signals into a second signal type. Additionally, in some embodiments, the adaptor may include a plurality of adaptors configured to separately receive one of the second signal types based on the multiple optical signals.

According to another aspect, a system comprising a signal conversion unit positioned at a pedestal remote from a plurality of subscriber's premises is disclosed. The signal conversion unit comprises an optical network unit positioned in a housing that is configured to convert a fiber optical signal into a second signal type, and an adaptor positioned in the housing. The adaptor is configured to convert the second signal type into an Ethernet-based RF signal and includes at least one port coupled to a coaxial cable. The system also includes an Ethernet over Coax (EoC) converter device positioned in each subscriber's premises that is coupled to at least one coaxial cable coupled to the signal conversion unit.

In some embodiments, the system may further comprise a switch configured to selectively connect each adaptor to the optical network unit. In some embodiments, the system may further comprise a splitter positioned in the housing and connected to the optical network unit. The splitter may be configured to convert a single fiber optical signal into multiple fiber optical signals. The optical network unit may be operable to convert each of the multiple optical signals into a second signal type. Additionally, in some embodiments, the adaptor may include a plurality of adaptors configured to separately receive one of the second signal types based on the multiple optical signals.

According to another aspect, a method of using any of the devices or apparatuses described herein is disclosed. In some embodiments, the method may comprise positioning a signal conversion unit at a pedestal remote from a plurality of subscriber's premises, and coupling an Ethernet over Coax (EoC) converter device positioned in each subscriber's premises to at least one coaxial cable that is coupled to the signal conversion unit.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
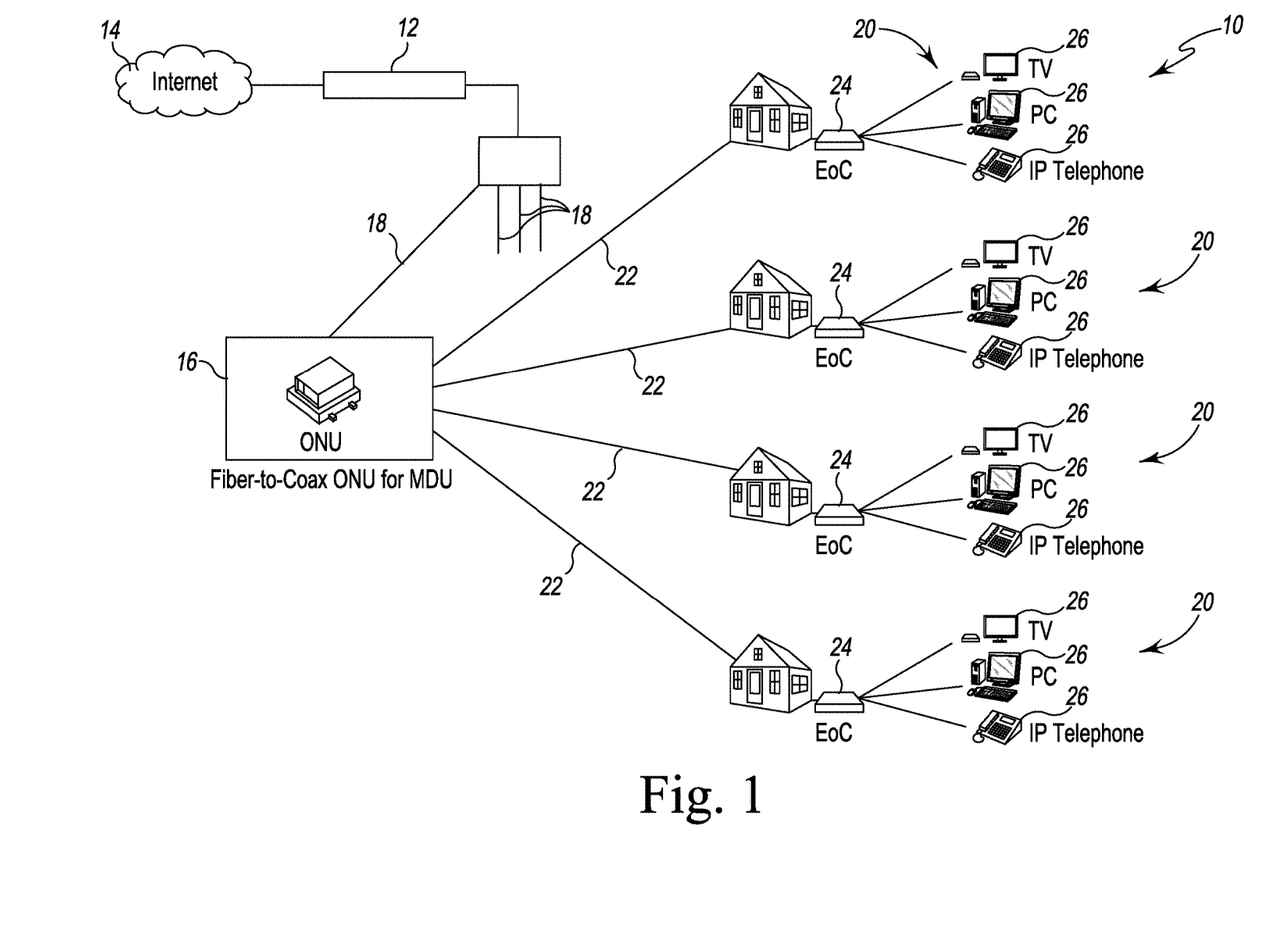
FIG. 1 illustrates a portion of a Community Access Television (CATV) system.

Referring now to FIG. 1, a portion of a Community Access Television (CATV) system 10 is shown. The system 10 includes an optical line terminal 12 that acts as the endpoint of a passive optical network (PON). In the illustrative embodiment, the passive optical network is a gigabit-capable passive optical network (PON). The optical line terminal 12 processes signals between the wider internet network 14 and one or more fiber-to-coax (FTC) conversion units 16. As described in greater detail below, each FTC unit 16 is designed to provide a full Internet Protocol (IP) based network structure to deliver 1 Gpbs home service through the existing HFC network structure for service providers to save capital expenditure, but still build the modern infrastructure to satisfy the uptrend bandwidth requirement of video, voice and data service to the home. Each FTC unit 16 is connected to the terminal 12 via one or more fiber optic cable lines 18.

The system 10 also includes one or more subscriber premises 20, which are connected to the FTC unit 16 via coaxial cables 22. In the system 10, each FTC unit is located on a pedestal, pole, or the like, typically in the vicinity of one or more subscriber premises 20. As shown in FIG. 1, each premises 20 includes a router or other converter device 24 that is connected to each line 22. home gateway/broadband router from EoC (Ethernet over Coax) to regular Ethernet (CAT-5 and above) or Wi-Fi (or WAN). Each router 24 converts the signals received over the line 22 into a form for use with one or more devices 26 such as, for example, televisions, computers, mobile devices, and so forth. The router 24 may create a local area network and act as a connection point for one or more Ethernet cables such as, for example, CAT-5 cables. The router 24 may additionally, or alternatively, include electronic circuitry for creating a wireless area network (WAN).

Figure 2:
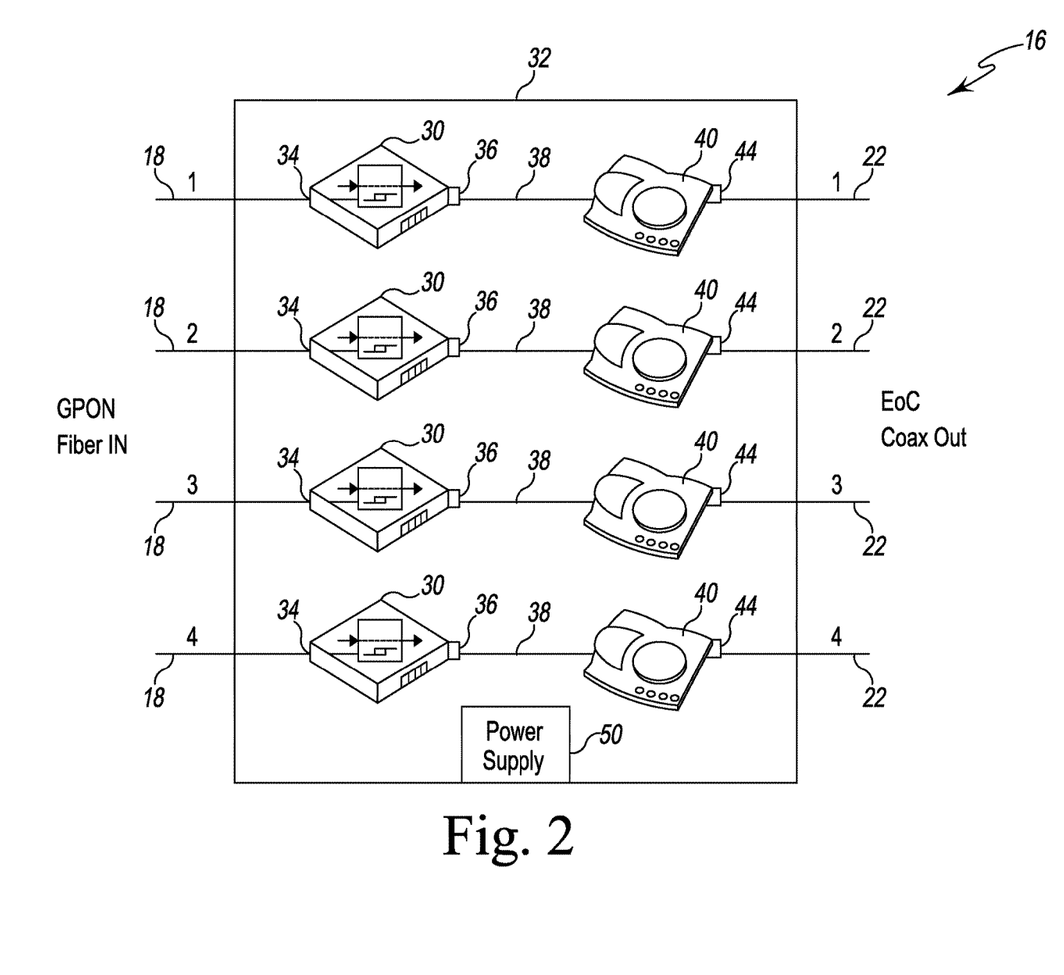
FIG. 2 illustrates a schematic of one embodiment of a fiber-to-coax conversion unit for use in the CATV system of FIG. 1.

Referring now to FIG. 2, the circuitry of one FTC unit 16 is shown in greater detail. In the illustrative embodiment, the FTC unit 16 is designed with a one-to-one connection to convert one GPON fiber connection to one EoC connection to each subscriber premises. As shown in FIGS. 1-2, the FTC unit 16 serves multiple subscribers and combines 4 or 8 (or multiple) pairs of fiber-EoC lines in an integrated outdoor box to support 1 Gbps downlink and 1 Gbps uplink over Ethernet for each subscriber premises. To do so, the FTC unit 16 includes a number of optical network units (ONU) 30 that are positioned in a housing 32. Each ONU 30 is operable to convert optical signal(s) into another signal type (in this case, an electrical signal suitable for transmission via an Ethernet cable). The ONU may utilize GPON, EPON, 10G-PON, and 10G-EPON to convert the signals. In the illustrative embodiment, the FTC unit 16 includes four ONUs. Each ONU 30 includes a 1270-1610 nm wavelength, fiber input port SC/APC optical fiber connector 34 that connects to a fiber optic cable 18. It should be appreciated that other connectors may be used. Each ONU 30 also includes a CAT-5 Ethernet port 36 configured to connect to an Ethernet cable 38 extending between each ONU 30 and an EoC adaptor 40.

As shown in FIG. 2, the FTC unit 16 includes one EoC adaptor 40 for each ONU 30. Each EoC adaptor 40 includes a CAT-5 or above Ethernet port 42 configured to connect to one of the Ethernet cables 38. Each adaptor 40 also includes a RF input/output port 44 to connect to a coaxial cable 22, which, in turn, is connected to a subscriber premises 20. In the illustrative embodiment, each port 44 is a 75 Ω F-connector. It should be appreciated that other connectors may be used. The unit 16 also includes a power supply 50 to provide electrical power to the various components included in the housing 32.

It should be appreciated that with the conversion unit 16, a service provider can convert an existing HFC network to reach 1 Gbps downlink speed over the coaxial cable 22 to each premises 20 without changing the existing wiring. The transition and conversion of HFC to GPON service to premises 20 is completely transparent to the residential customers, and each conversion can simultaneously support four homes. It should be appreciated that in other embodiments the FTC conversion unit may be configured to simultaneously support eight or more homes.

It should also be appreciated that no infrastructure change is needed to deliver high-speed Internet service to each premises 20 because the FTC unit 16 uses the existing HFC network in transition to the GPON deployment, thereby saving capital expenditure for the service providers. Additionally, by using Internet Protocol (IP) as the transport layer, the network service deployed to each premises via fiber and coaxial cable can reach 1 Gbps speed and be easily expanded to higher speed with advanced modulation technology developed for data transmission over coaxial cable, thereby creating the opportunity for cable service providers to compete against telecom/DSL and wireless operators in providing high-speed Internet service to the subscriber's premises. As described above, the change is completely transparent to the residential and business subscribers because the subscribers' premises connects to the GPON service via a coaxial cable 22. without the subscribers being aware of the difference of existing hardware/software but receiving the benefits of much higher Internet speed. Further, with IPv6 enabled on the addressing plane, Internet of Thing (IoT) applications can be developed to reach every network enabled device at the subscriber's premises for management, security and monitoring purpose.

Figure 3:
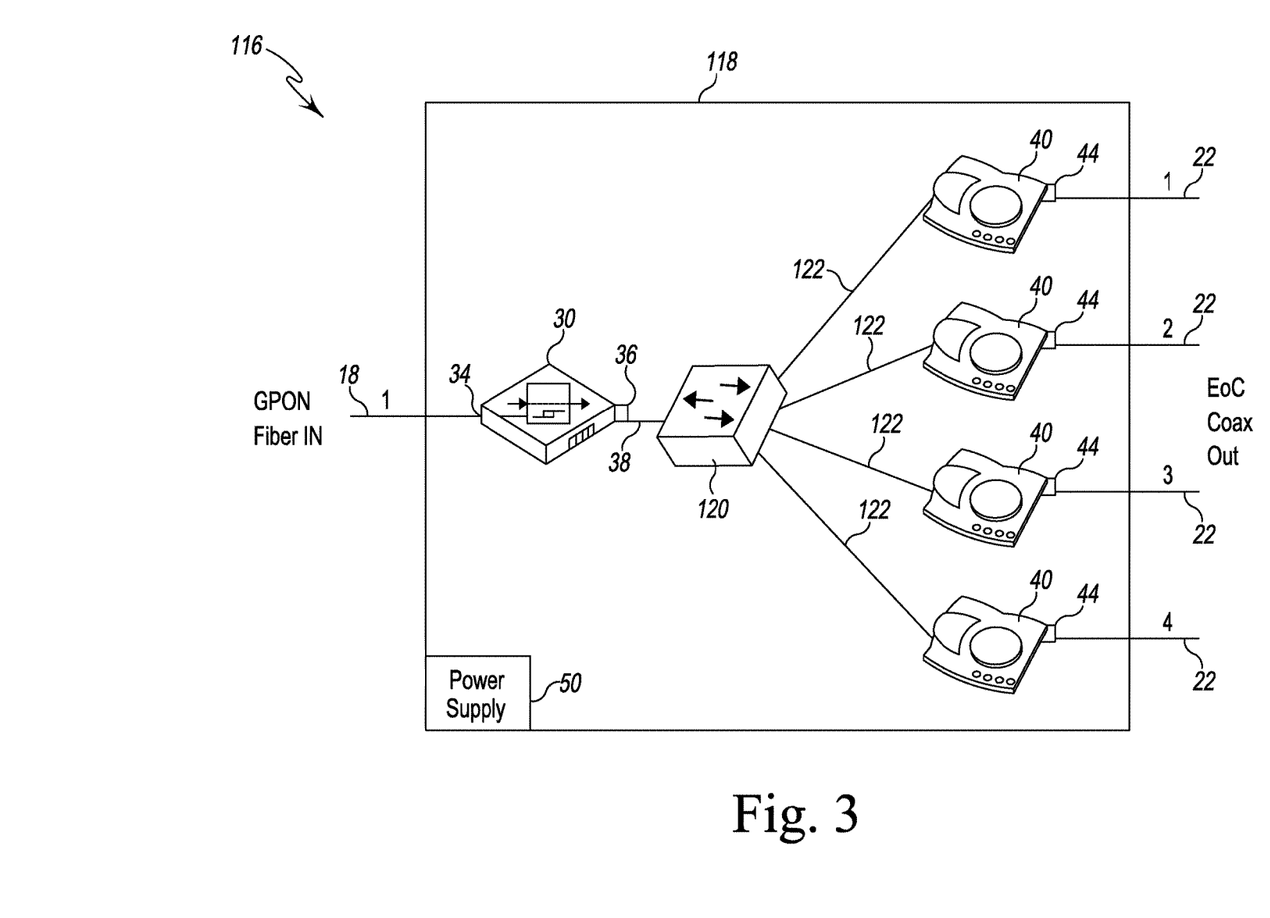
FIG. 3 illustrates a schematic of another embodiment of a fiber-to-coax conversion unit.

Referring now to FIG. 3, another embodiment of a FTC unit (hereinafter referred to as FTC unit 116) is shown. It should be appreciated that an FTC unit 116 may be used in the system 10 as an alternative to an FTC unit 16. In the system 10, each FTC unit 116 is located on a pedestal, pole, or the like, typically in the vicinity of one or more subscriber premises 20. The FTC unit 116, like the FTC unit 16, is configured to convert a GPON fiber connection to one EoC connection to each subscriber premises. In the illustrative embodiment, however, the FTC unit 116 is designed with one-to-many connections to convert one GPON fiber connection to multiple EoC connections. The FTC unit 116 is configured to split one fiber line 18 to multiple coaxial cables 22 in an integrated housing to support sub-1 Gbps downlink and sub-1 Gbps uplink over Ethernet for each subscriber premises.

As shown in FIG. 3, the FTC unit 116 includes a single ONU 30 that is positioned in a housing 118 with a number of EoC adaptors 40. The ONU 30 includes a 1270-1610 nm wavelength, fiber input port SC/APC optical fiber connector 34 that connects to a fiber optic cable 18. It should be appreciated that other connectors may be used. The ONU 30 also includes a CAT-5 or above Ethernet port 36 configured to connect to an Ethernet cable 38 extending between the ONU 30 and a switch circuit 120 positioned in the housing 118. The unit 16 also includes a power supply 50 to provide electrical power to the various components included in the housing 118.

As shown in FIG. 3, the switch circuit 120 is connected to each EoC adaptor 40 via an Ethernet cable 122. In the illustrative embodiment, the switch circuit 120 is operable to selectively connect each adaptor 40 (and hence each subscriber premises 20) to the ONU 30. Each EoC adaptor 40 includes a CAT-5 or above Ethernet port 42 configured to connect to one of the Ethernet cables 122. Each adaptor 40 also includes a RF input/output port 44 to connect to a coaxial cable 22, which, in turn, is connected to a subscriber premises 20. In the illustrative embodiment, each port 44 is a 75 Ω F-connector. It should be appreciated that other connectors may be used.

Figure 4:
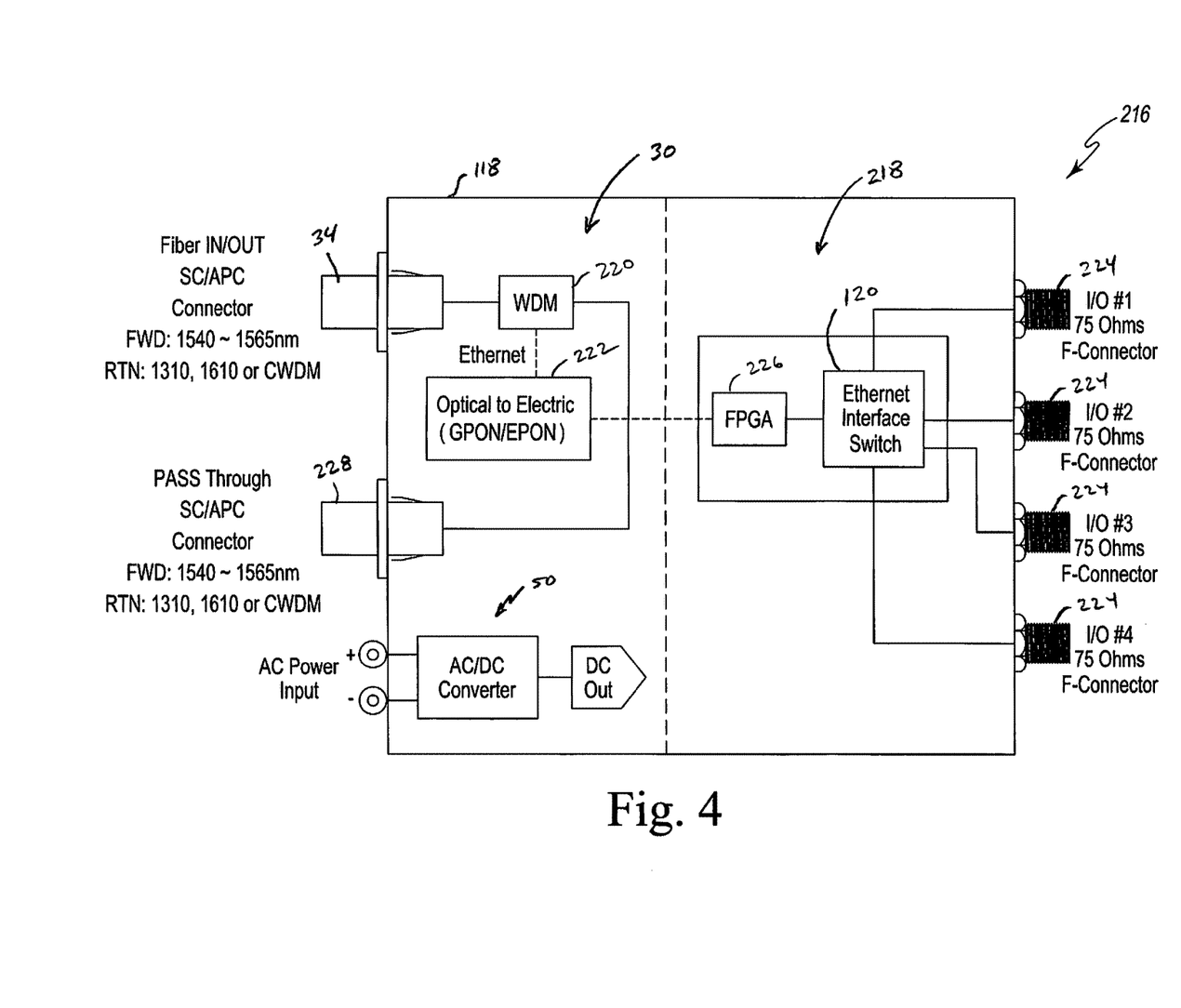
FIG. 4 illustrates a schematic of another embodiment of a fiber-to-coax conversion unit.

Referring now to FIG. 4, one embodiment of an FTC unit 116 (hereinafter referred to as FTC unit 216) is shown. It should be appreciated that an FTC unit 216 may be used in the system 10 as an alternative to an FTC unit 16. In the system 10, each FTC unit 216 is located on a pedestal, pole, or the like, typically in the vicinity of one or more subscriber premises 20. The FTC unit 216, like the FTC units 16, 116, is configured to convert a GPON fiber connection to one EoC connection to each subscriber premises. In the illustrative embodiment, the FTC unit 216 is also designed with one-to-many connections to convert one GPON fiber connection to multiple EoC connections. The FTC unit 216 includes an optical network unit 30 and an EoC adapter 218. The optical network unit 30 includes a wavelength-division multiplexer (WDM) 220 and an optical-to-Ethernet converter 222. The adaptor 218 includes an interface switch 120 and an FPGA 226 connected to the converter 222. The FTC unit 216 is configured to split one fiber line 18 to multiple coaxial cables 22 in an integrated housing 118 to support sub-1 Gbps downlink and sub-1 Gbps uplink over Ethernet for each subscriber premises. The FTC unit 216 includes a fiber connector 34 configured to be coupled to the fiber line 18 and a number of F-Connectors 224 configured to be connected to the coaxial cables 22. Power is supplied via a power supply 50. The FTC unit 216 also includes another pass through connector 228.

Figure 5:
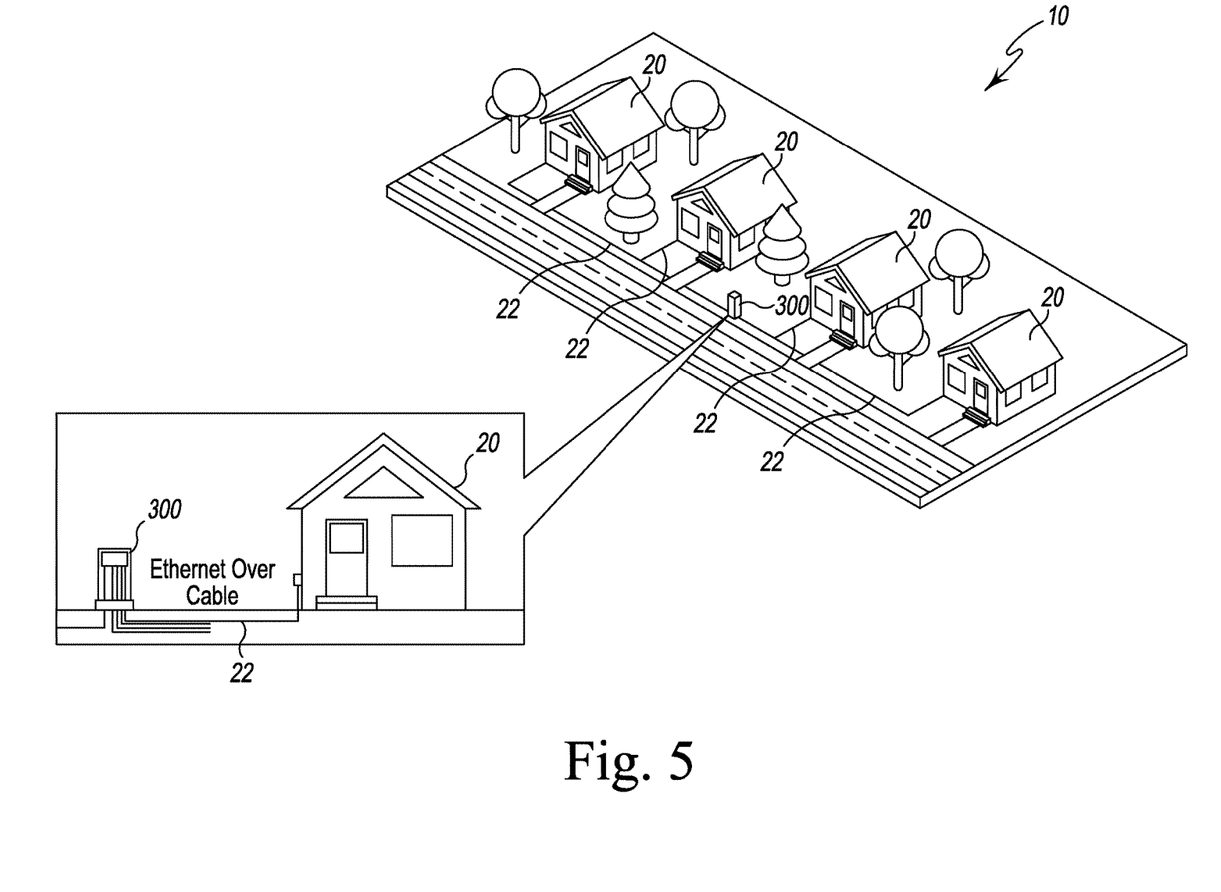
FIG. 5 illustrates a number of subscriber premises connected to the fiber-to-coax conversion unit of FIG. 2.
Figure 6:
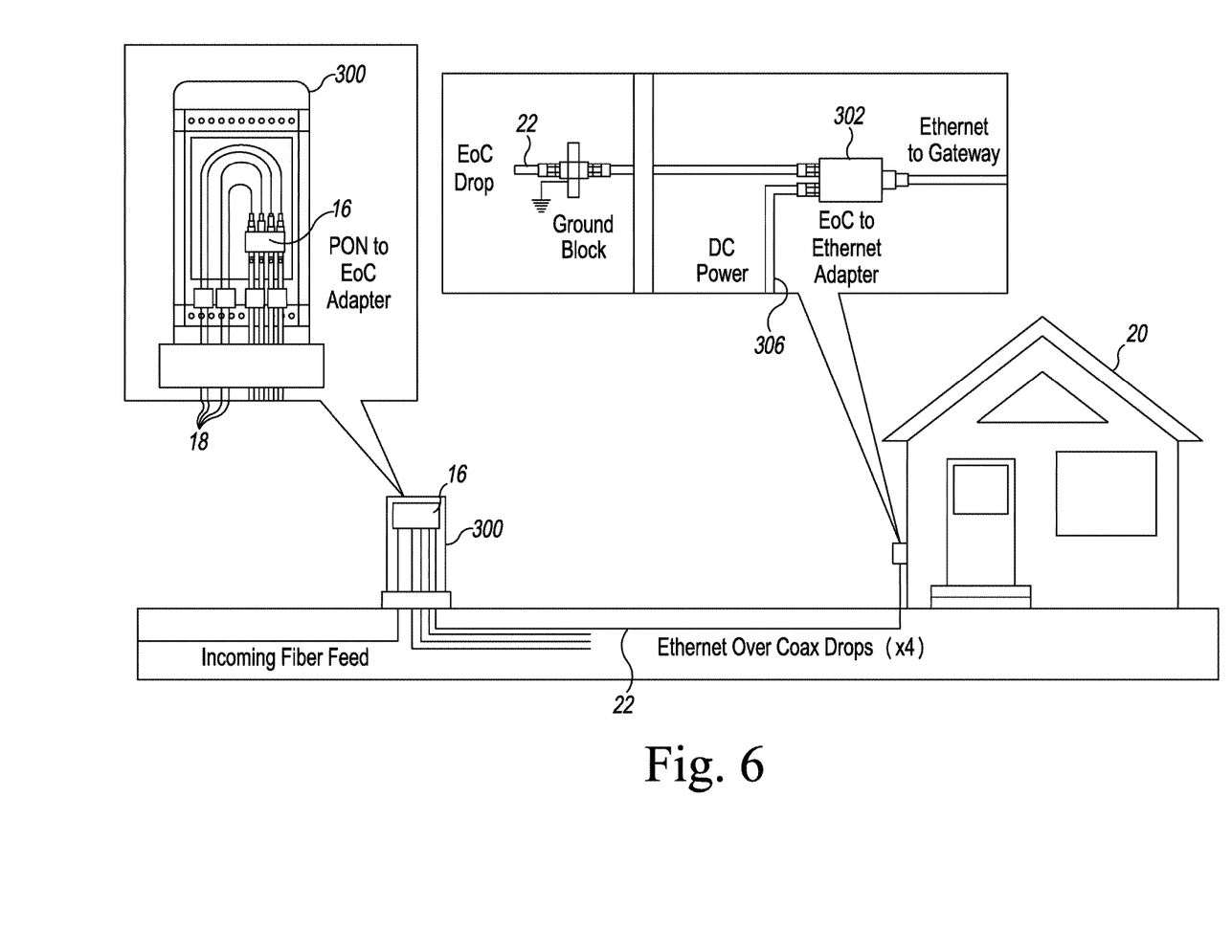
FIG. 6 is another illustration of the fiber-to-coax conversion unit in use with an EoC to Ethernet conversion device.
Figure 7:
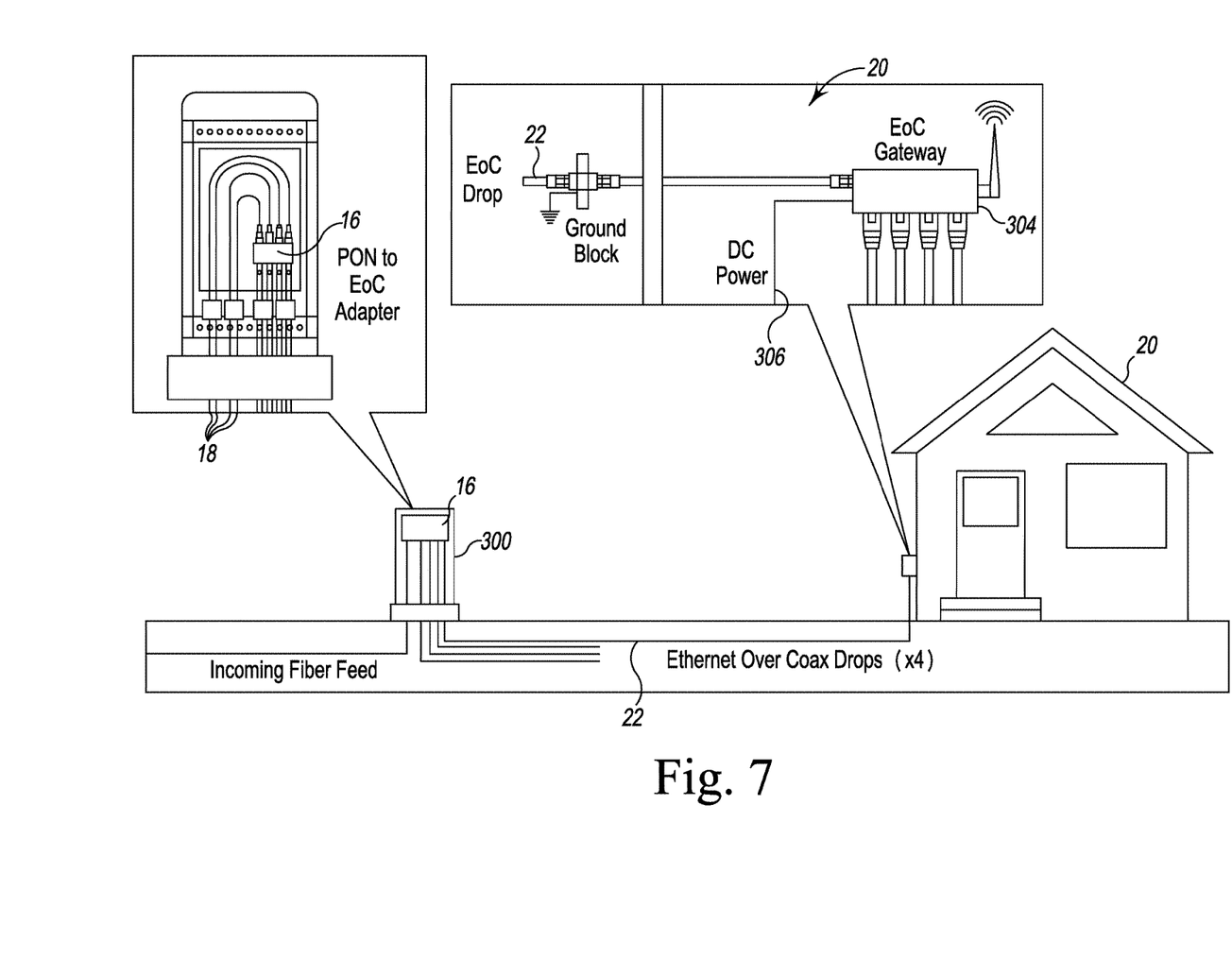
FIG. 7 is an illustration similar to FIG. 6 showing an EoC to wireless conversion device.

As described above, the system 10 includes one or more subscriber premises 20, as shown in FIG. 5. In the illustrative embodiment, an FTC unit 16 is placed at a pedestal 300 in the vicinity of the subscriber premises 20 and is connected to each premises 20 via a coaxial cable 22. As shown in FIGS. 6 and 7, each premises 20 includes a converter device 24, such as for example, an EoC to Ethernet adaptor 302 (see FIG. 6) or Wi-Fi gateway 304 (see FIG. 7), that is connected to each line 22. Each router 24 is powered via cable 306 and converts the signals received over the line 22 into a form for use with one or more devices such as, for example, televisions, computers, mobile devices, and so forth.

As shown in FIGS. 6-7, the FTC unit 16 is positioned within the pedestal 300. In the illustrative embodiment, the FTC unit 16 is designed with a one-to-one connection to convert one GPON fiber connection to one EoC connection to each subscriber premises. It should be appreciated that in other embodiments the FTC unit 116 and associated circuitry described in regard to FIG. 3 above may also be used. In the illustrative embodiment, power from cable 306 in the subscriber premises 20 is supplied from the converter device 24 over the cable 22 to the FTC unit 16, thereby supplying any power necessary to operate the ONU and other circuitry of the FTC unit 16. In some embodiments, the pedestal 300 or FTC unit 16 may include a visual indicator to indicate a connection has been made to a subscriber premises 20 and/or indicate that power is being received.

Figure 8:
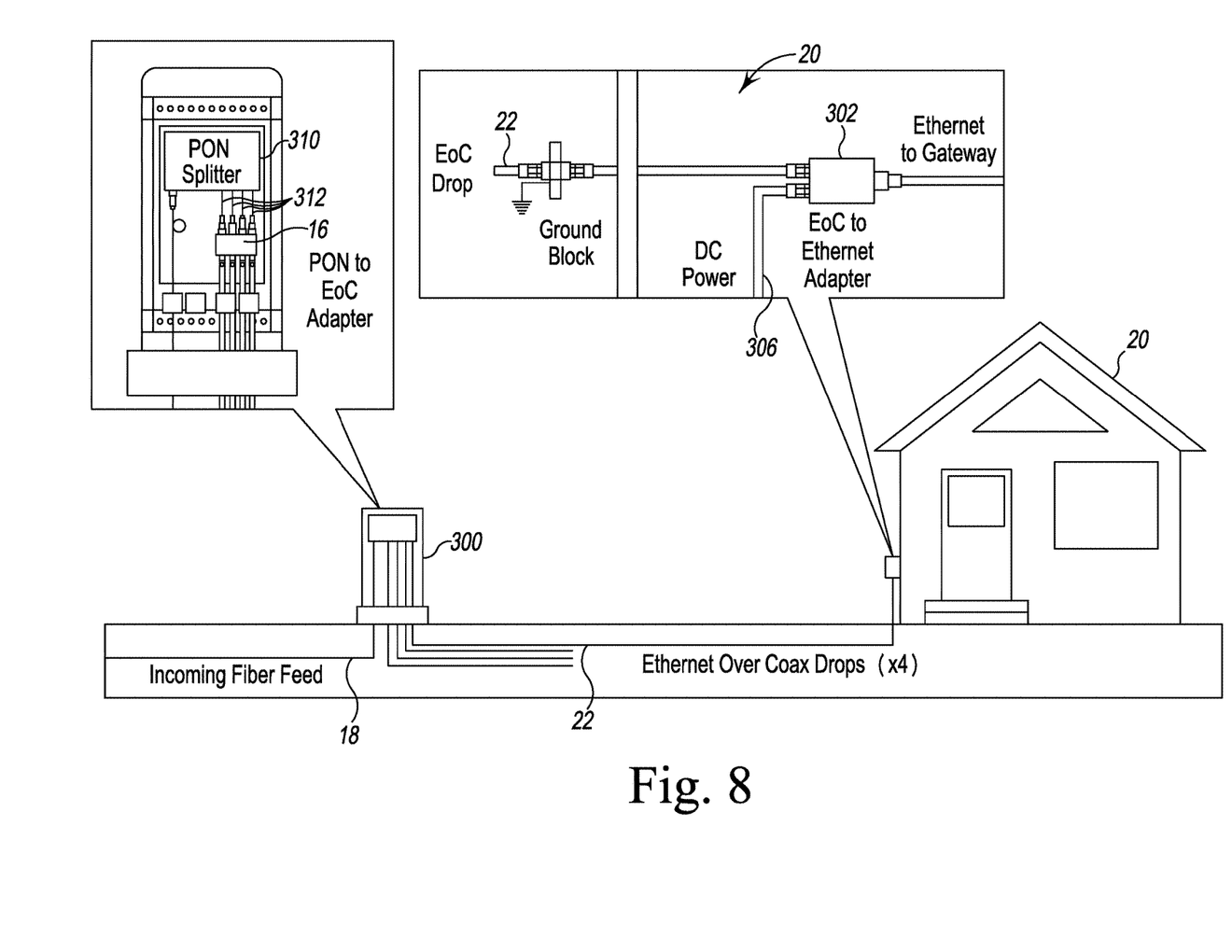
FIG. 8 illustrates a schematic of another embodiment of a fiber-to-coax conversion unit in use with an EoC to Ethernet conversion device.
Figure 9:
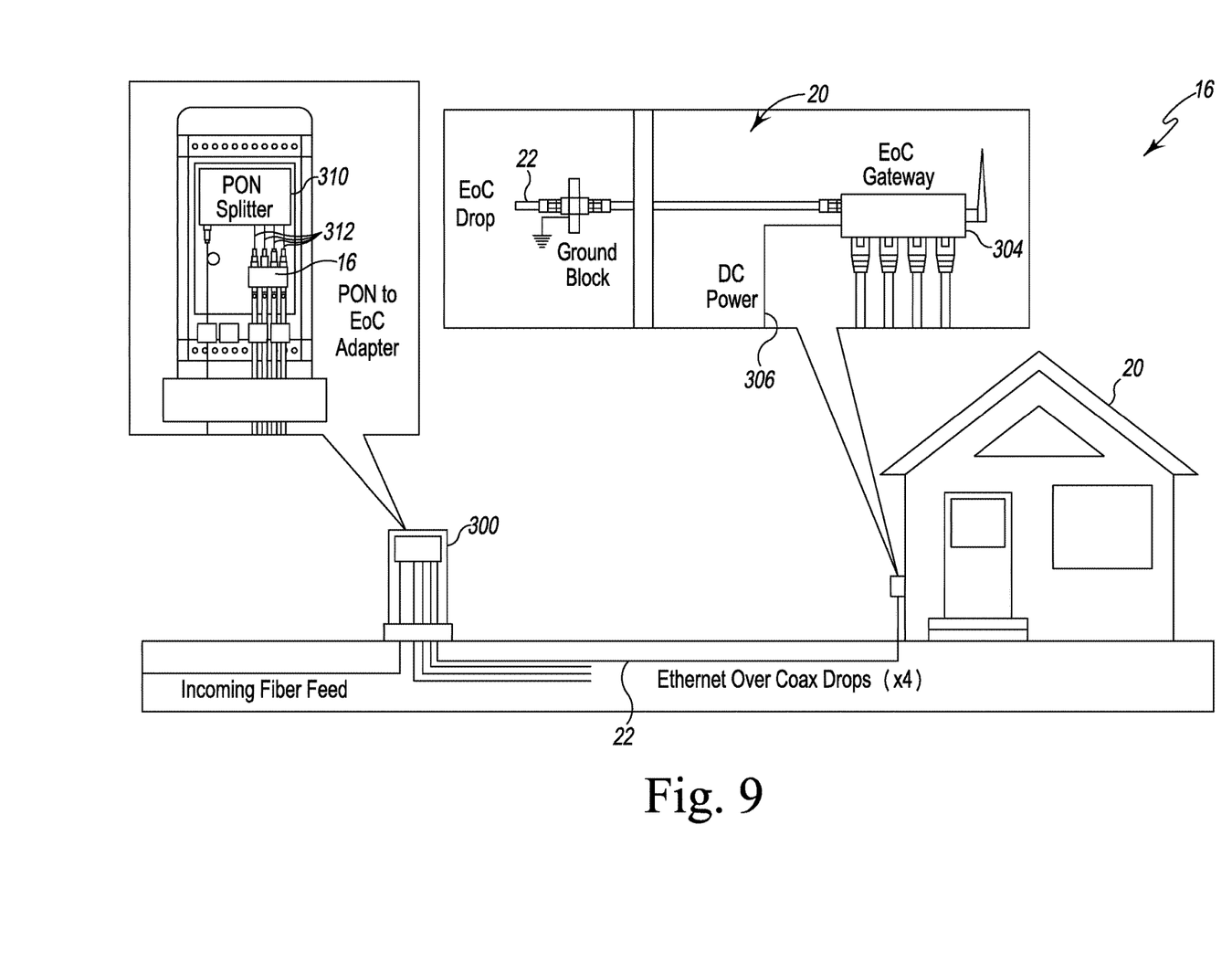
FIG. 9 is an illustration similar to FIG. 8 showing an EoC to wireless conversion device.

Referring now FIGS. 8-9, other configurations of the system 10 are shown. In these embodiments, the pedestal 300 also includes a splitter circuit 310 to divide a single fiber line 18 into four separate lines 312. Each of the lines 312 are connected within the pedestal 300 to the FTC unit.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An apparatus, comprising:
   a housing,
   an optical network unit positioned in the housing, the optical network unit configured to convert a fiber optical signal into an electrical signal suitable for transmission via an Ethernet cable, and
   an adaptor positioned in the housing and connected to the optical network unit, the adaptor configured to convert the the electrical signal into an Ethernet-based RF signal, the adaptor including a port configured to receive a coaxial cable connector.

2. The apparatus of claim 1, wherein the optical network unit includes a plurality of optical network units operable to utilize at least one of GPON, EPON, 10G-PON, and 10G-EPON.

3. The apparatus of claim 1, wherein the adaptor includes a plurality of adaptors.

4. The apparatus of claim 3, further comprising a switch configured to selectively connect each adaptor to the optical network unit.

5. The apparatus of claim 1, further comprising a splitter positioned in the housing and connected to the optical network unit, the splitter being configured to convert a single fiber optical signal into multiple fiber optical signals, wherein the optical network unit is operable to convert each of the multiple optical signals into the second signal type.

6. The apparatus of claim 5, wherein the adaptor includes a plurality of adaptors configured to separately receive one of the second signal types based on the multiple optical signals.

7. A system comprising:
a signal conversion unit positioned at a pedestal remote from a plurality of subscriber's premises, the signal conversion unit comprising an optical network unit positioned in a housing, the optical network unit configured to convert a fiber optical signal into an electrical signal suitable for transmission via an Ethernet cable, and an adaptor positioned in the housing and connected to the optical network unit, the adaptor being configured to convert the electrical signal into an Ethernet-based RF signal, the adaptor including at least one port coupled to a coaxial cable, and
an Ethernet over Coax (EoC) converter device positioned in each subscriber's premises that is coupled to at least one coaxial cable coupled to the signal conversion unit.

8. The system of claim 7, wherein the optical network unit includes a plurality of optical network units operable to utilize at least one of GPON, EPON, 10G-PON, and 10G-EPON.

9. The system of claim 7, wherein the adaptor includes a plurality of adaptors, each adaptor being coupled to a different EoC converter device.

10. The system of claim 9, further comprising a switch configured to selectively connect each adaptor to the optical network unit.

11. The system of claim 7, further comprising a splitter positioned in the housing and connected to the optical network unit, the splitter being configured to convert a single fiber optical signal into multiple fiber optical signals, wherein the optical network unit is operable to convert each of the multiple optical signals into the second signal type.

12. The apparatus of claim 11, wherein the adaptor includes a plurality of adaptors configured to separately receive one of the second signal types based on the multiple optical signals.

13. A method comprising:
positioning a signal conversion unit at a pedestal remote from a plurality of subscriber's premises, the signal conversion unit comprising an optical network unit positioned in a housing, the optical network unit configured to convert a fiber optical signal into an electrical signal suitable for transmission via an Ethernet cable, and an adaptor positioned in the housing, the adaptor configured to convert the electrical signal from the optical network unit into an Ethernet-based RF signal, the adaptor including at least one port coupled to a coaxial cable, and
coupling an Ethernet over Coax (EoC) converter device positioned in each subscriber's premises to at least one coaxial cable that is coupled to the signal conversion unit.

* * * * *